United States Patent

Wickstrom et al.

[11] Patent Number: 5,825,426
[45] Date of Patent: Oct. 20, 1998

[54] VIDEO SUBSAMPLING MODE DECISIONS BASED UPON INTERPOLATION ERROR MEASURES

[75] Inventors: Larry Wickstrom, Beaverton; Joseph N. Romriell, Hillsboro, both of Oreg.

[73] Assignee: Intel Corporation, Santa Clara, Calif.

[21] Appl. No.: 772,014

[22] Filed: Dec. 19, 1996

Related U.S. Application Data

[63] Continuation of Ser. No. 325,048, Oct. 18, 1994, abandoned.

[51] Int. Cl.⁶ ........................................ H04N 7/24
[52] U.S. Cl. .................................................. 348/425
[58] Field of Search ..................... 348/425, 424, 348/416, 415, 409, 399, 390, 384; 382/236, 238, 232; 358/430, 432, 433, 426; H04N 7/13

[56] References Cited

U.S. PATENT DOCUMENTS

| | | | |
|---|---|---|---|
| 4,698,672 | 10/1987 | Chen et al. ............................. | 348/415 |
| 4,862,264 | 8/1989 | Wells et al. ............................. | 348/416 |
| 4,910,594 | 3/1990 | Kondo .................................... | 348/409 |
| 4,965,667 | 10/1990 | Trew et al. ............................. | 348/425 |
| 5,136,396 | 8/1992 | Kato et al. ............................. | 358/426 |
| 5,212,548 | 5/1993 | de Haan et al. ....................... | 348/416 |
| 5,262,855 | 11/1993 | Alattar et al. ......................... | 348/424 |
| 5,293,230 | 3/1994 | Golin ..................................... | 348/415 |

*Primary Examiner*—Bryan S. Tung
*Attorney, Agent, or Firm*—Blakely, Sokoloff, Taylor & Zafman

[57] ABSTRACT

A video system that determines an indication of interpolation errors for each of a set of available subsampling modes for encoding a target video frame that contains a set of pixel data values corresponding to an image scene is described. Each available subsampling mode provides a differing degree of subsampling on the target video frame. The video system determines a selected subsampling mode from the available subsampling modes such that the selected subsampling mode provides an attainable degree of subsampling with minimal loss in image quality.

30 Claims, 6 Drawing Sheets

VIDEO SUBSAMPLING MODE DECISIONS BASED UPON INTERPOLATION ERROR MEASURES

This is a Continuation Application of application Ser. No. 08/325,048, filed Oct. 1, 1994 now abandoned.

BACKGROUND OF THE INVENTION

1. Field of the Invention

The present invention pertains to the field of video systems. More particularly, this invention relates to a method for selecting subsampling modes for video compression in a video system base upon interpolation error measures.

2. Background

Prior video communication systems commonly employ data compression techniques to enable the real-time transfer of digitized video images over a relatively low bandwidth communication line. Typically, such prior video systems perform digital sampling on a video signal generated by a video camera. Such digital sampling provides an incoming digital video bit stream from the video camera that indicates the content of the corresponding image scene.

Such a video system usually encodes the incoming digital video bit stream according to a variety of available data compression techniques to generate compressed video data. The compressed video data may be transmitted to a remote video system in a video conferencing system via a communication link. Typically, a remote video system in such a video conferencing system receives the compressed video data over the communication link and decodes the compressed video data to reconstruct a decompressed version of the original digital video bit stream.

Such video data compression techniques also enable compressed data storage of video images into a mass storage device such as a disk device or a CD ROM device. Such a video system retrieves the compressed video data from the mass storage device and then typically reconstructs a decompressed version of the original digital video bit stream to drive a display device. Such compressed video data storage increases the amount of video information stored in a given area of mass storage media, thereby increasing the effective data densities of mass storage devices such as disk devices and CD ROM devices.

The original digital video bit stream sampled by such a video system typically comprises a series of video frames. Each video frame usually comprises an array of pixel data that includes color or intensity values representing the original image scene sensed by the video camera. Typically, video data compression techniques are designed to minimize the size of the compressed video frames while maintaining the best possible reconstructed video image as the compressed video frames are decoded.

A video system may encode each incoming video frame as either an inter frame or an intra frame. Typically, an inter frame is an incoming video frame encoded relative to a preceding video frame in the series of incoming video frames. An intra frame is typically an incoming video frame encoded without a relation to any other video frame in the series of incoming video frames.

In addition, such a video system may implement a variety of subsampling modes for intra frame encoding and a variety of subsampling modes for inter frame encoding. Such subsampling modes typically provide varying degrees of subsampling for the compressed frames. For example, prior subsampling modes may provide one to one, two to one, or four to one degrees of pixel subsampling for the compressed frames.

A subsampling mode is typically chosen based upon an efficiency in recreating the original video image scene. Some prior subsampling modes are more efficient for encoding images having sharp edges and fast transitions. Other prior subsampling modes are more efficient for encoding detailed areas of an image. Therefore, such a video system should advantageously select from among the subsampling modes available for encoding inter frames and intra frames on a frame by frame basis.

In addition, such a video system typically encodes the incoming stream of video frames to maintain a compression level determined by the bandwidth constraints of the communication link or by the bandwidth constraints of the mass storage media used to store the compressed video images. As a consequence, the subsampling mode selection for video compression must usually take into account a target compression level as well as the quality of the reconstructed video images.

SUMMARY AND OBJECTS OF THE INVENTION

One object of the present invention is to increase the efficiency of video data compression in a video system with minimal loss in visual quality.

Another object of the present invention is to reduce the bandwidth utilization of a communication link for a video communication system with minimal loss in visual quality.

Another object of the present invention is to reduce the mass storage space required to store compressed video images in a video system.

Another object of the present invention is to increase the efficiency of video data compression while maintaining the compression level required by bandwidth constraints in the video system.

A further object of the present invention is to increase the efficiency of video data compression by blending interpolation error indications for the differing subsampling modes of video encoding.

Another object of the present invention is to select subsampling modes in a video data compression system using differing interpolation error indications for intra frame encoding modes and inter frame encoding modes.

These and other objects of the invention are provided by a video system that determines an indication of interpolation errors for each of a set of available subsampling modes for encoding a target video frame that contains a set of pixel data values corresponding to an image scene. Each available subsampling mode provides a differing degree of subsampling on the target video frame. The video system then determines a selected subsampling mode from the available subsampling modes such that the selected subsampling mode provides a highest degree of subsampling of the available subsampling modes that have the indication of interpolation errors below a threshold value. The video system encodes the target video frame according to the selected subsampling mode.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
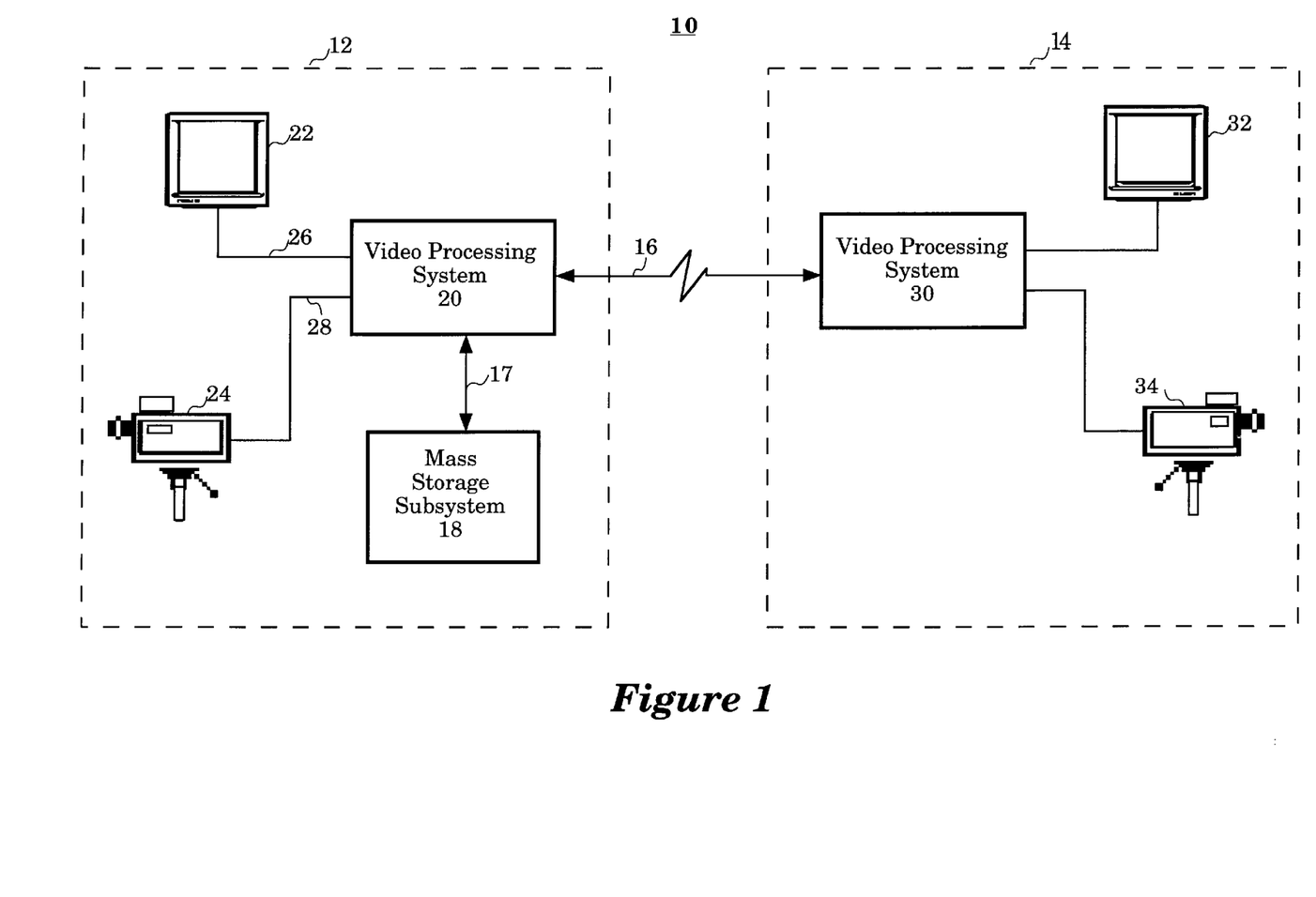
FIG. 1 illustrates a video conferencing system for one embodiment which comprises a pair of video systems that are each coupled for communication over a communication link.

FIG. 1 illustrates a video conferencing system 10 for one embodiment. The video conferencing system 10 comprises a pair of video systems 12 and 14. The video systems 12 and 14 are each coupled for communication over a communication link 16. For one embodiment, the communication link 16 is a local area network communication line. For another embodiment, the communication link 16 is a telephone line.

The video system 12 comprises a video processing system 20, a video display monitor 22, a video camera 24, and a mass storage subsystem 18. The video system 14 comprises a video processing system 30, a video display monitor 32, and a video camera 34.

The video communication system 10 provides real time video conferencing between the video systems 10 and 12 via the communication link 16. In addition, the video communication system 10 provides video playback from the mass storage subsystem 18 to either the video display monitor 22 or the video display monitor 32 via the communication link 16. The video data compression technique employed by the video processing systems 20 and 30 enable reduced bandwidth communication over the communication link 16 and reduced storage areas in the mass storage subsystem 18 for a given image scene.

For one embodiment, the video processing system 20 receives an analog video signal from the video camera 24 over a video signal line 28. The video processing system 20 performs digital sampling on the analog video signal from the video camera 24 to generate a digital video bit stream. For other embodiments, the video camera 24 comprises a digital video camera and the video signal line 28 carries a digital video bit stream.

For one embodiment, the incoming digital video bit stream from the video camera 24 comprises a series of video frames. Each video frame includes a Y plane, a U plane, and a V plane. The Y plane provides a matrix of pixel intensity values for the corresponding image scene sensed by the video camera 24. The U and the V planes provide a matrix of pixel color values from the corresponding image scene.

The video processing system 20 encodes the incoming digital video bit stream from the video camera 24 according to a data compression technique. The video processing system 20 encodes the Y plane, the U plane, and the V plane of each incoming video frame independently. The video processing system 20 transmits the compressed video bit stream comprising a series of compressed frames to the video system 14 over the communication link 16.

The video processing system 20 receives the compressed video bit stream from the video system 14 over the communication link 16. The video processing system 20 decodes the compressed video bit stream according to the video data compression technique originally applied to encode the original digital video bit stream. The video processing system 20 generates a set of video signals 26 corresponding to the decompressed video bit stream. The video signals 26 drive the video display monitor 22.

In addition, the video processing system 20 transfers the compressed video bit stream for storage to the mass storage subsystem 18 over a bus 17. Thereafter, the video processing system 20 accesses the compressed video bit stream from the mass storage subsystem 18, decodes the compressed video bit stream, and generates the video signals 26 which drive the video display monitor 22 to reconstruct the original image scene.

Figure 2:
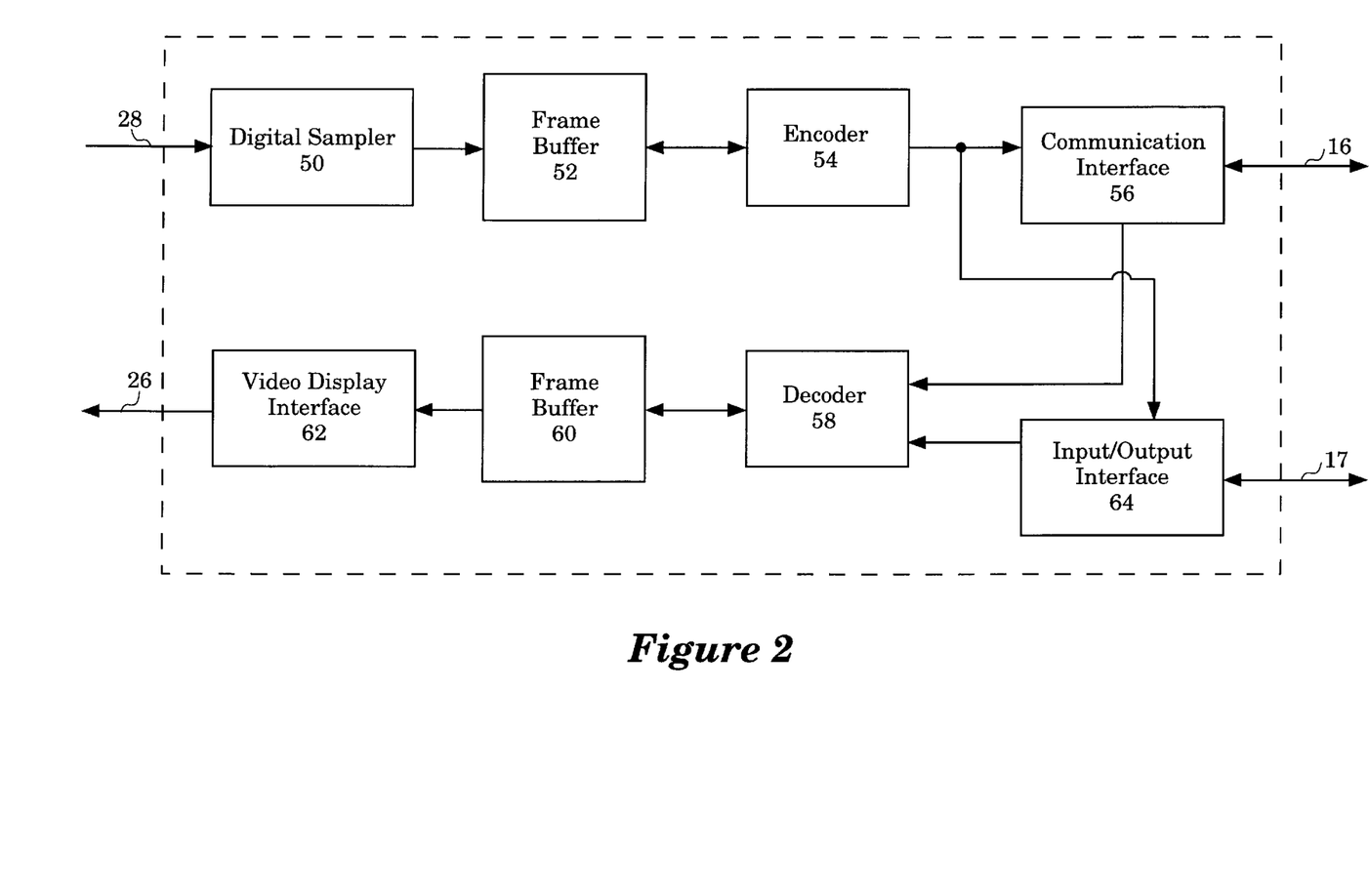
FIG. 2 illustrates a video processing system for one embodiment which includes a digital sampler, a frame buffer, an encoder, a communication interface, a decoder, a video display interface, and an input/output interface.

FIG. 2 illustrates the video processing system 20 for one embodiment. The video processing system 20 includes a digital sampler 50, a frame buffer 52, an encoder 54 and a communication interface 56. The video processing system 20 further comprises a decoder 58, a frame buffer 60, a video display interface 62, and an input/output interface 64.

The digital sampler 50 receives an analog video signal from the video camera 24 over the video signal line 28. The digital sampler 50 digitizes the incoming analog video signal and transfers the corresponding digitized video bit stream into the frame buffer 52. The digitized video bit stream in the frame buffer 52 comprises a series of video frames.

The encoder 54 reads the video frames from the frame buffer 52 and performs data compression on the video frames. A video frame being encoded by the encoder 54 is hereinafter referred to as a target video frame. A video frame used as a preceding reference frame for inter frame encoding by the encoder 54 is hereinafter referred to as a predicted frame. The encoder 54 transfers compressed video frames to the communication interface 56 for transfer over the communication link 16.

For one embodiment, the communication interface 56 performs segmentation functions on the compressed video frames from the encoder 54. The communication interface 56 thereafter transmits the packetized compressed video frames over the communication link 16 to the video system 14.

The communication interface 56 also receives compressed video communication packets over the communication link 16 from the video system 14. The communication interface 56 performs packet reassembly functions on the incoming packets and transfers the corresponding compressed video bit stream to the decoder 58 for decompression.

The input/output interface 64 accesses compressed video bit stream from the mass storage subsystem 18 via the bus 17. The input/output interface 64 transfers the compressed video bit stream to the decoder 58 for decompression.

The decoder 58 decodes the compressed video bit stream received from either the communication interface 56 or the input/output interface 64. The compressed video bit stream includes inter frames and intra frames. The compressed video bit stream from the communication interface 56 or the input/output interface 64 includes control bits for each video frame that indicate whether the corresponding video frame is an inter frame or an intra frame. The decoder 58 accordingly decodes the inter frames and intra frames and transfers the decoded video frames into the frame buffer 60.

The video display interface 62 accesses the decoded video frames from the frame buffer 60. The video display interface 62 performs digital to analog conversion functions on the decoded video frames and generates an analog video signal that drives the video display device 22 via the video signal lines 26.

The video processing system 30 is similar to the video processing system 20 and includes a digital sampler, frame buffers, an encoder, a communication interface, a decoder, and a video display interface. The video processing systems 20 and 30 enable full duplex video communication between the video systems 12 and 14 via the communication link 16.

Figure 3:
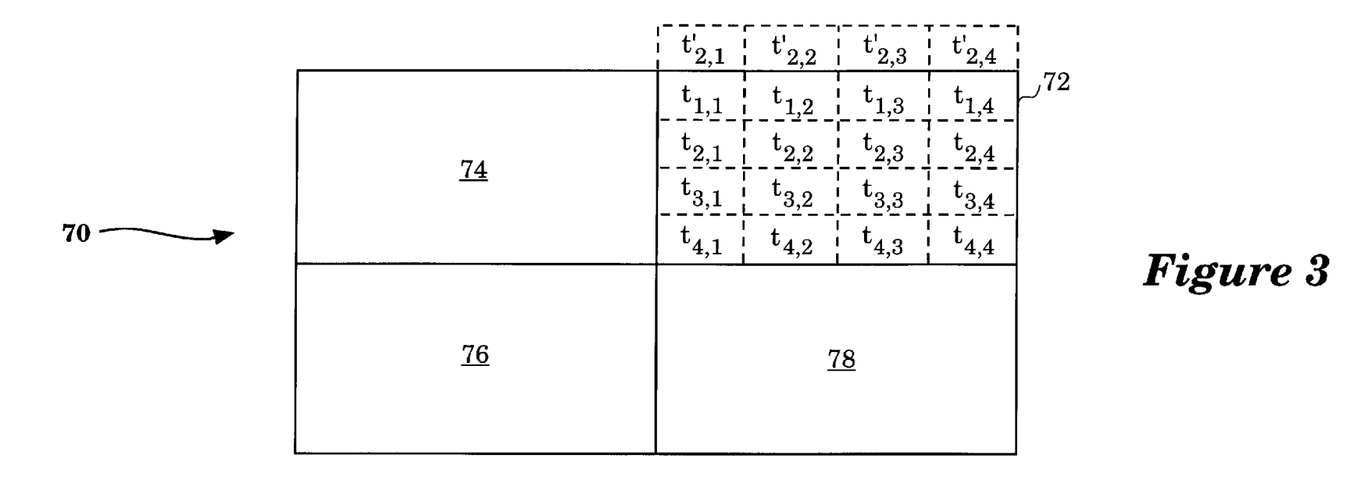
FIG. 3 illustrates a target video frame which is stored in the frame buffer that and which is subdivided into a set of target cells.

FIG. 3 illustrates a target video frame 70 stored in the frame buffer 52. The target video frame 70 is digitally sampled from the video camera 24 by the digital sampler 50. The encoder 54 subdivides the target video frame 70 into a set of target cells 72–78. The encoder 54 encodes each of the target cells 72–78. For each target cell 72–78 of an inter frame, the encoder 54 renders a decision whether to encode the target cell as an inter cell or an intra cell.

The target cell 72 comprises a set of target pixel values $t_{1,1}$ through $t_{4,4}$ for each of the Y plane, the U plane or the V plane of the target video frame 70. In general, each target cell 72–78 is comprised of an array of target pixels values $t_{1,1}$ through $t_{r,c}$ where r=the number of rows in a target cell and c equals the number of columns in a target cell. For this example, r=c=4. The 16×16 video pixel resolution illustrated by the target video frame 70 is simplified for purposes of illustration. The target video frame 70 represents higher resolution video frames.

The encoder 54 encodes the target cell 72 as an intra cell by encoding each row of target pixel values t1,1 through t4,4 relative to a row of pixel values located immediately above the row. In the example shown, the pixel row immediately above the target cell 72 is outside the active video display area of the video frame 70. In such a case, the encoder 54 encodes an intra cell for the target cell 72 by encoding the pixel values $t_{1,1}$ through $t_{1,4}$ relative to a row of gray level pixel values yielding a row of difference values ($t_{1,1}$–gray level) through ($t_{1,4}$–gray level). The remaining row of the target cell 72 are each encoded relative to the immediately preceding row.

The gray level pixel values are represented by a set of pixel values $t'_{2,1}$ through $t'_{2,4}$ which are each equal to 128 for eight bit pixels. The row of gray level pixel values is designated as row 2 for purposes of a vertical gradient determination as described below.

For another example, the encoder 54 encodes the top row of the target cell 78 relative to the pixel values $t_{4,1}$ through $t_{4,4}$ of the target cell 72.

The encoder 54 encodes the target cell 72 into an inter cell by encoding the pixel values $t_{1,1}$ through $t_{4,4}$ relative to pixel values in a corresponding predicted cell of a predicted video frame. A predicted video frame is a reconstructed version of a preceding video frame.

Figure 4:
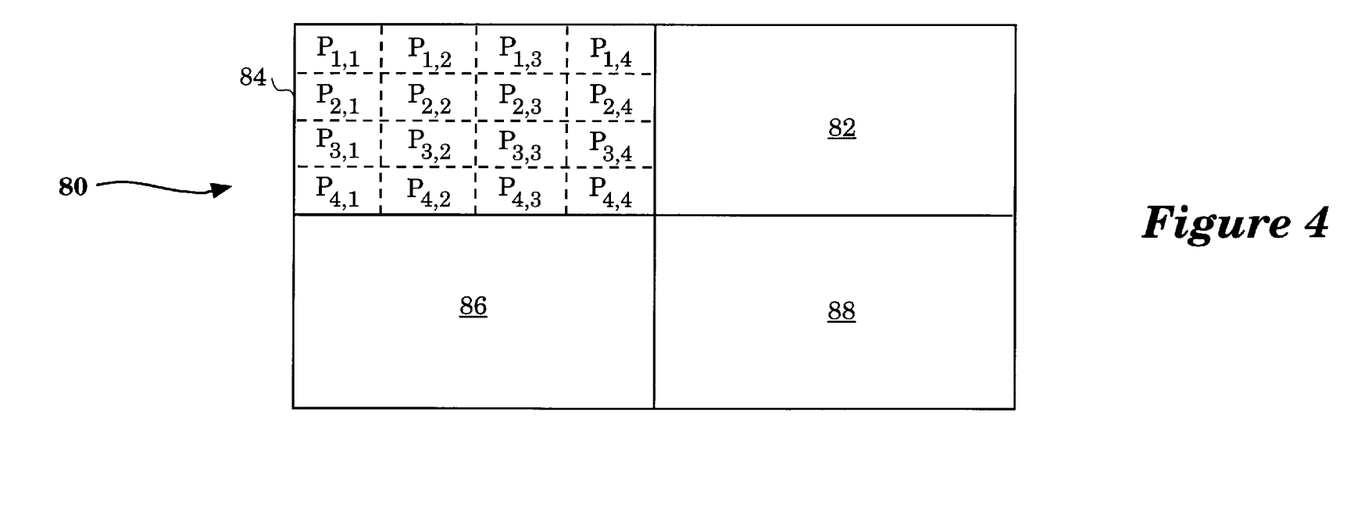
FIG. 4 illustrates a predicted video frame which comprises a set of predicted cells which the encoder uses to encode an inter cell.

FIG. 4 illustrates a predicted video frame 80. The predicted video frame 80 comprises a set of predicted cells 82–88. The encoder 54 selects one of the predicted cells 82–88 to encode the target cell 72 as an inter cell. The encoder 54 selects one of the predicted cells for inter frame encoding based upon a pattern match and/or a motion estimation between the predicted video frame 80 and the target video frame 70.

The encoder 54 selects predicted cells for inter frame encoding such that the predicted cell may be in a completely different cell position as shown. In addition, a predicted cell may be offset in relation to the target cell by an amount less than the dimensions of a cell. For example, the predicted and target cells may be offset by one pixel row or pixel column or a fraction of a pixel row or pixel column.

Assume for this example that the predicted cell for the target cell 72 is the predicted cell 84. The encoder 54 generates an inter cell for the target cell 72 by encoding the pixel values $t_{1,1}$ through $t_{4,4}$ relative to pixel values $p_{1,1}$ through $p_{4,4}$ of the predicted cell 84. The inter cell for the target cell 72 comprises a matrix of difference values ($t_{1,1}$–$p_{1,1}$) through ($t_{4,4}$–$p_{4,4}$).

Figure 5:
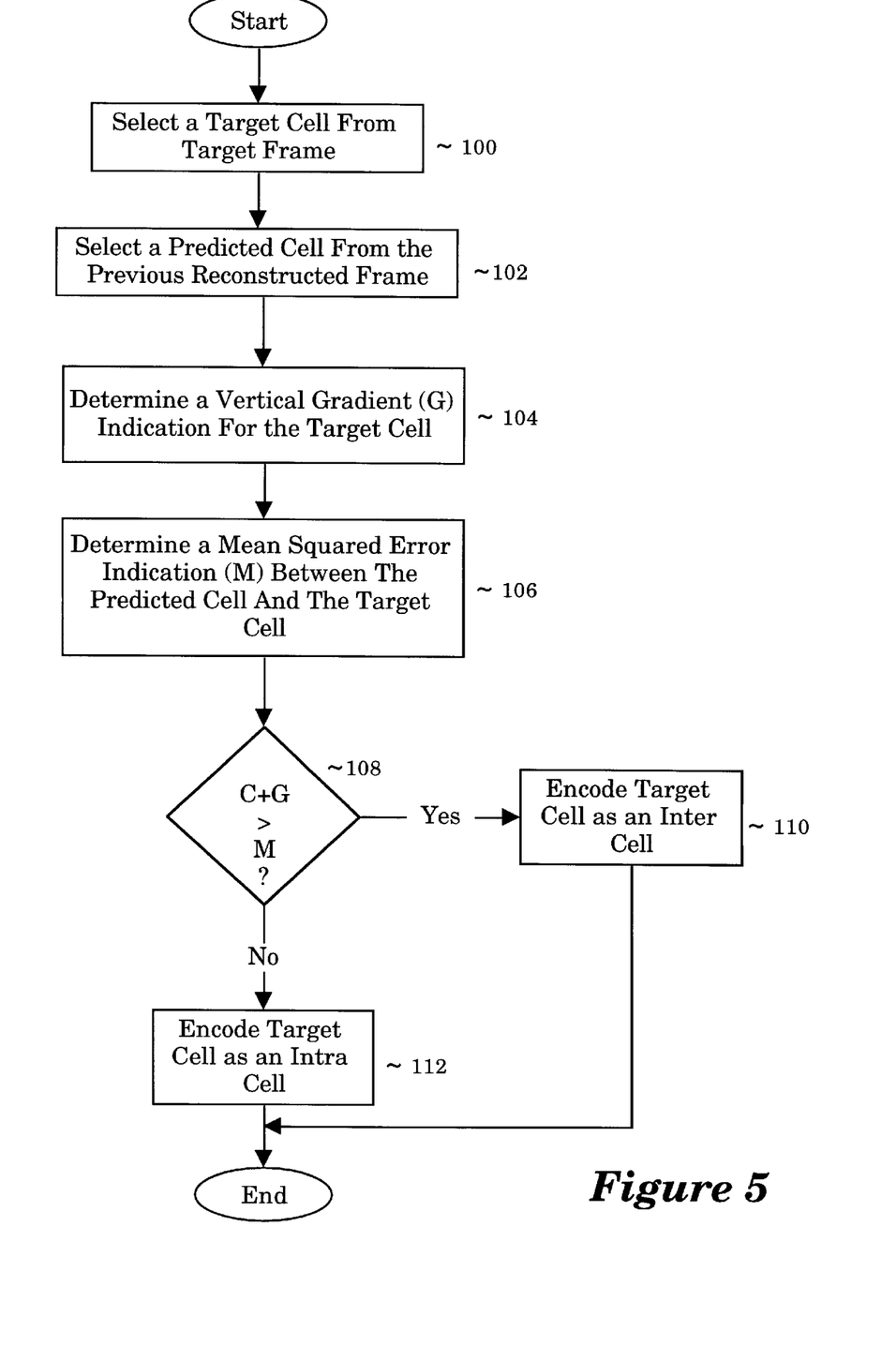
FIG. 5 illustrates a method for determining whether to encode a target cell as an inter cell or an intra cell.

FIG. 5 illustrates a method for determining whether to encode a target cell such as the target cell 72 as an inter cell or an intra cell. At block 100, the encoder 54 selects a target cell from the target frame 70. The target cell selected is the target cell 72. Thereafter at block 102, the encoder 54 selects a predicted cell from the preceding reconstructed video frame. The previous reconstructed video frame for this example is the predicted frame 80. The encoder 54 selects the predicted cell 84 as the predicted cell of the predicted frame 80 having the closest correlation to the target cell 72 according to motion estimation.

At block 104, the encoder 54 determines a vertical gradient indication (G) for the target cell 72. The vertical gradient indication is computed according to the following equation:

$$G = \sqrt{\frac{\sum_{i=1}^{r} \sum_{j=1}^{c} (t_{i,j} - t_{i-1,j})^2}{rc}}$$

where r and c represent the number of rows and columns, respectively, in the target cell 72. The term $t_{ij}$ represents the $i^{th}$ row and $j^{th}$ column of the target cell 72 where $t_{1,1}$ is the upper left hand corner.

The vertical gradient indication G uses values from the cell above the current cell in the target image. For cells touching the top of an image, the line above the top line in the image, line 0 is set to line 2 for calculating the vertical gradient indication G. The line above the top line in the image for the vertical gradient calculation G are represented in FIG. 3 by pixel values $t'_{2,1}$ through $t'_{2,4}$.

The vertical gradient indication G provides an indication of the encoding efficiency for the target cell 72 if encoded as an intra cell.

At block 106, the encoder 54 determines the encoding efficiency for the target cells 72 if encoded as an inter cell. The inter cell efficiency is indicated by a mean squared error indication (M) between the predicted cell 84 and the target cell 72. The encoder 54 determines the mean squared error indication according to the following equation:

$$M = \sqrt{\frac{\sum_{i=1}^{r} \sum_{j=1}^{c} (t_{i,j} - p_{i,j})^2}{rc}}$$

where r and c represent the number of rows and columns, respectively, in the target cell 72. The term $t_{ij}$ represents the $i^{th}$ row and $j^{th}$ column of the target cell 72 where $t_{1,1}$ is the upper left hand corner. The term $p_{ij}$ represents the $i^{th}$ row and $j^{th}$ column of the predicted cell 84 from motion estimation.

Thereafter, at decision block 108 the encoder 54 determines whether the vertical gradient indication G is sufficiently high relative to the mean squared indication M. If the vertical gradient indication G plus a predetermined constant C is greater than the mean squared error indication M at decision block 108, then control proceeds to block 110. At block 110 the encoder 54 encodes the target cell 72 as an inter cell because the vertical gradient indication is sufficiently high in comparison to the mean squared error indication, thereby indicating that an inter cell is more efficient than an intra cell.

If the vertical gradient indication G plus a predetermined constant C is not greater than the mean squared error indication M at decision block 108, then control proceeds to block 112. At block 112 the encoder 54 encodes the target cell 72 as an intra cell because the vertical gradient indication G is sufficiently low in relation to the mean squared error indication.

The intra cell encoding at block 112 is selected if the vertical gradient statistic G indicates than an intra cell is more efficient than an inter cell due to the content of the target cell 72. The vertical gradient statistic G is specifically designed to indicate the efficiency of the intra cell encoding technique described above wherein each row of the target cells is encoded relative to an adjacent preceding row. The constant C is selected to adjust a balance between inter cell and intra cell encoding in order to provide efficient encoding.

Figure 6:
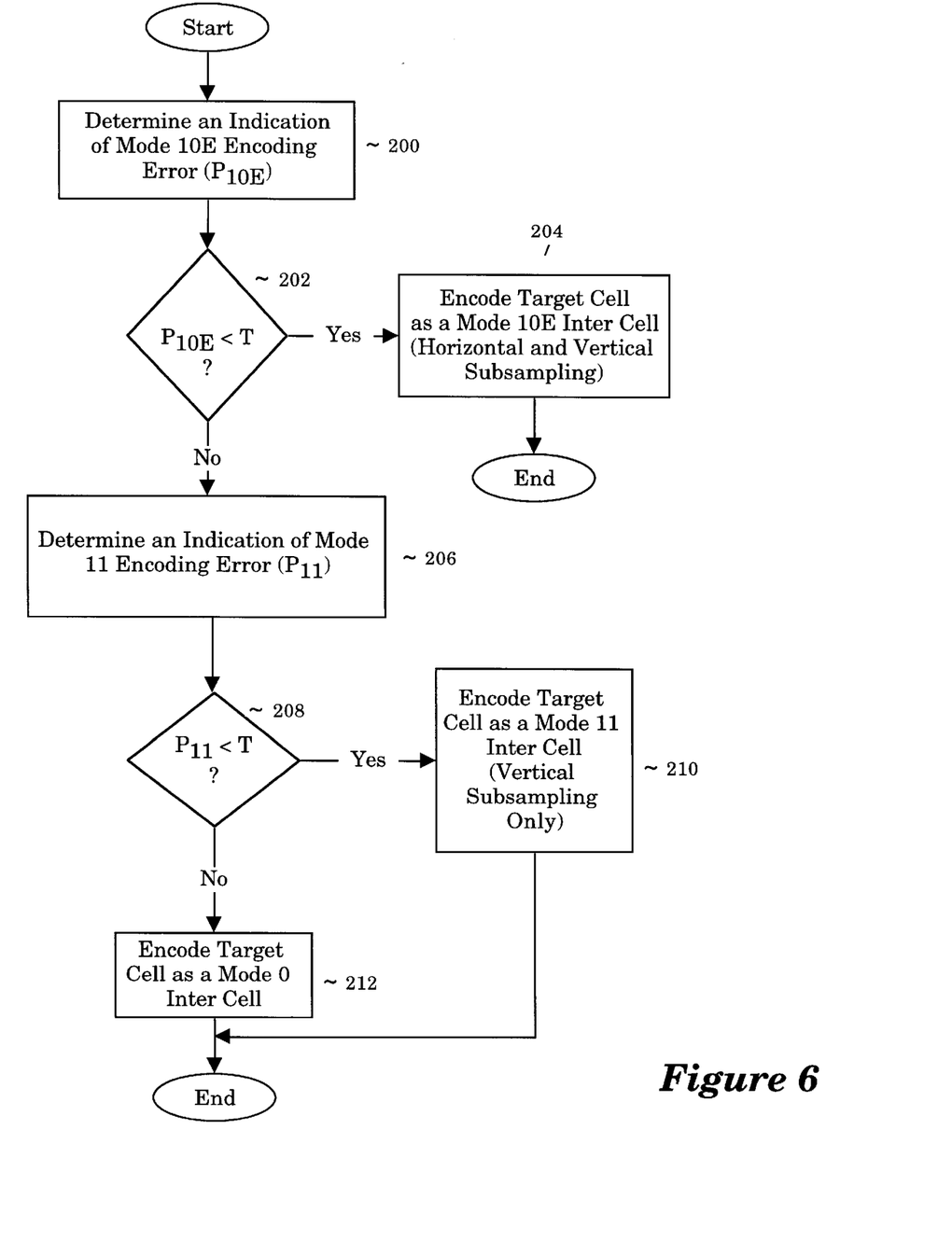
FIG. 6 illustrates a method for encoding a target cell a as an inter cell according to a set of inter cell encoding modes that provide varying degrees of subsampling.

FIG. 6 illustrates a method for encoding the target cell 72 as an inter cell at block 110. For one embodiment, the encoder 54 encodes the target cell 72 as an inter cell according to a set of inter cell encoding modes including mode 0, mode 11 and mode 10E. The inter cell encoding mode 0 provides zero subsampling. The inter cell encoding mode 11 provides two to one subsampling, and the inter cell encoding mode 10E provide four to one subsampling.

At block 200, the encoder 54 determines an indication of mode 10E encoding error ($P_{10E}$). For one embodiment, the encoder 54 determines the indication of mode 10E encoding error $P_{10E}$ by blending an indication of the mean absolute difference of interpolation errors for mode 10E ($D_{10E}$) with an indication of the mean squared errors of interpolation errors for mode 10E ($M_{10E}$) according to the following equation $$P_{10E} = \beta_{10E} \sqrt{(1 - \alpha_{10E})(D_{10E})^2 + \alpha_{10E} M_{10E}}$$

The term $\beta_{10E}$ is a positive constant, and the term $\alpha_{10E}$ is a constant in a range [0..1] for blending. The encoder 54 determines the indication of the mean absolute difference of interpolation errors $D_{10E}$ and the indication of the mean squared error of interpolation errors $M_{10E}$ according to the following equations $$D_{10E} = \left( \sum_{i=1}^{r/2} \sum_{j=1}^{c/2} |t_{2i-1,2j-1} - a_{2i,2j}| - |t_{2i-1,2j} - a_{2i,2j}| - |t_{2i,2j-1} - a_{2i,2j}| - |t_{2i,2j} - a_{2i,2j}| \right) \frac{1}{rc}$$

$$M_{10E} = \left( \sum_{i=1}^{r/2} \sum_{j=1}^{c/2} (t_{2i-1,2j-1} - a_{2i,2j})^2 - (t_{2i-1,2j} - a_{2i,2j})^2 - (t_{2i,2j-1} - a_{2i,2j})^2 - (t_{2i,2j} - a_{2i,2j})^2 \right) \frac{1}{rc}$$

where, $$a_{i,j} = \frac{(t_{i-1,j-1} + t_{i-1,j} + t_{i,j-1} + t_{i,j}) - (p_{i-1,j-1} + p_{i-1,j} + p_{i,j-1} + p_{i,j})}{4}$$

The terms r and c represent the number of rows and columns, respectively, in the target cell 72. The term $t_{ij}$ represents the $i^{th}$ row and $j^{th}$ column of the target cell 72 where $t_{1,1}$ is the upper left hand corner. The term $p_{ij}$ represents the $i^{th}$ row and $j^{th}$ column of the predicted cell 84 from motion estimation.

The weighted blending of the indication of the mean absolute difference of interpolation errors $D_{10E}$ and the indication of the mean squared error of interpolation errors $M_{10E}$ provides a method for adjusting the relative effect of each type of error indication. For example, the mean squared error of interpolation errors $M_{10E}$ tends to improve sharp edges and fast transitions in the reconstructed image scene. The mean absolute difference of interpolation errors $D_{10E}$ improves the quality of detailed areas of the reconstructed image scene.

Thereafter at decision block 202, the encoder 54 determines whether the indication of mode 10E encoding error $P_{10E}$ is less than a threshold value (T) that corresponds to the current compression level. The threshold value T is maintained by a bit rate control function of the encoder 54. The encoder 54 maintains the threshold value T to vary the size of the encoded target cells according to the required encoding bit rate as indicated by the current compression level. If the indication of mode 10E encoding error $P_{10E}$ is less than T at decision block 202, then control proceeds to block 204. Otherwise, control proceeds to block 206.

At block 204, the encoder 54 encodes the target cell 72 as a mode 10E inter cell. The encoder 54 generates the mode 10E inter cell by first determining a matrix of difference values $(t_{1,1} - p_{1,1})$ through $(t_{4,4} - p_{4,4})$ between the target cell 72 and the predicted cell 84. Thereafter, the encoder 54 performs a four to one subsampling on the difference values such that each 2×2 matrix portion of the target cell 72 is represented by a single replicated difference value.

At block 206, the encoder 54 determines an indication of mode 11 encoding error ($P_{11}$). The encoder 54 determines the indication of mode 11 encoding error $P_{11}$ by blending an indication of the mean absolute difference of interpolation errors for mode 11 ($D_{11}$) with an indication of the mean squared error of interpolation errors for mode 11 ($M_{11}$) as given by the following equation $$P_{11} = \beta_{11} \sqrt{(1 - \alpha_{11})(D_{11})^2 + \alpha_{11} M_{11}}$$

The term $\beta_{11}$ is a positive constant, and the term $\alpha_{11}$ is a constant in a range [0..1] for blending. The indication of the mean absolute difference of interpolation errors for mode 11 $D_{11}$ and the indication of the mean squared error of interpolation errors for mode 11 $M_{11}$ are given by the following equations $$D_{11} = \left( \sum_{i=1}^{r/2} \sum_{j=1}^{c} |(t_{2i-1,j} - P_{2i-1,j}) - (t_{2i,j} - P_{2i,j})| \right) \frac{1}{rc}$$

$$M_{11} = \left( \sum_{i=1}^{r/2} \sum_{j=1}^{c} ((t_{2i-1,j} - P_{2i-1,j}) - (t_{2i,j} - P_{2i,j}))^2 \right) \frac{1}{rc}$$

Figure 7:
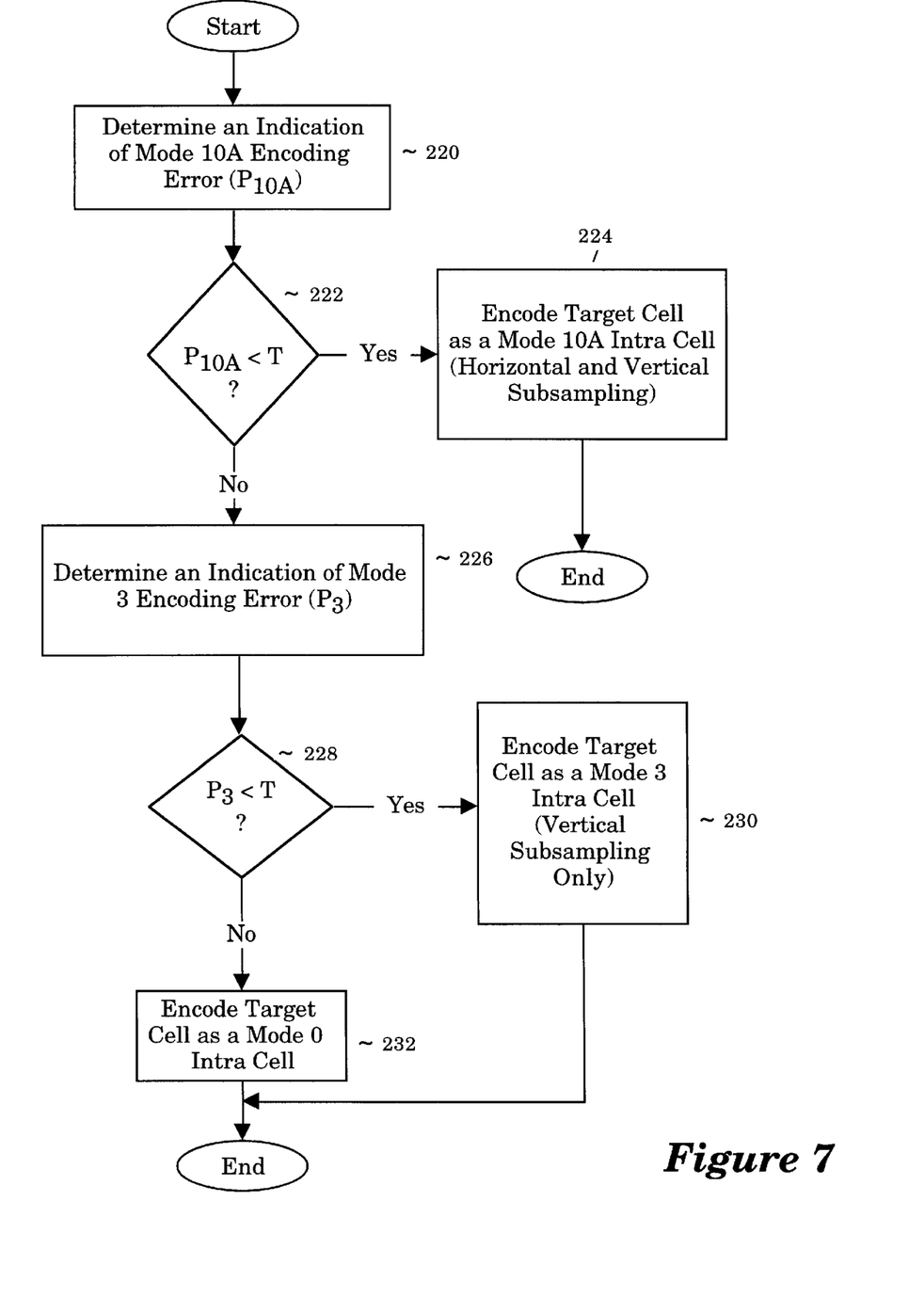
FIG. 7 illustrates a method for encoding a target cell as an intra cell according to a set of intra cell encoding modes that provide varying degrees of sub sampling.

The weighted blending of the indication of the mean absolute difference of interpolation errors $D_{11}$ and the indi- $$D_{10A} = \left( \sum_{i=1}^{r/2} \sum_{j=1}^{c/2} |t_{2i,2j-1} - t_{2i,2j}| + \left| t_{2i-1,2j-1} - \frac{t_{2i-2,2j-1} + \frac{t_{2i,2j-1} + t_{2i,2j}}{2}}{2} \right| + \left| t_{2i-1,2j} - \frac{t_{2i-2,2j} + \frac{t_{2i,2j-1} + t_{2i,2j}}{2}}{2} \right| \right) \frac{1}{rc}$$

$$M_{10A} = \left( \sum_{i=1}^{r/2} \sum_{j=1}^{c/2} (t_{2i,2j-1} - t_{2i,2j})^2 + \left( t_{2i-1,2j-1} - \frac{t_{2i-2,2j-1} + \frac{t_{2i,2j-1} + t_{2i,2j}}{2}}{2} \right)^2 + \left( t_{2i-1,2j} - \frac{t_{2i-2,2j} + \frac{t_{2i,2j-1} + t_{2i,2j}}{2}}{2} \right)^2 \right) \frac{1}{rc}$$

cation of the mean squared error of interpolation errors $M_{11}$ provides a method for adjusting the relative effect of each type of error indication. The mean squared error of interpolation errors $M_{11}$ tends to improve sharp edges and fast transitions while the mean absolute difference of interpolation errors $D_{11}$ improves the quality of detailed areas of the reconstructed image scene.

Thereafter at decision block 208, the encoder 54 determines whether the indication of mode 11 encoding error $P_{11}$ is less than the threshold value T for the current compression level maintained by the bit rate control function of the encoder 54. If the indication of mode 11 encoding error $P_{11}$ is less than the threshold value T at decision block 208, then control proceeds to block 210.

At block 210, the encoder 54 encodes the target cell 72 as a mode 11 inter cell which provides two to one subsampling. The encoder 54 generates a mode 11 inter cell for the target cell 72 by determining a matrix of difference values ($t_{1,1}$–$p_{1,1}$) through ($t_{4,4}$–$p_{4,4}$) between the target cell 72 and the predicted cell 84 and then by replicating the difference values such that each 1×2 matrix portion of the target cell 72 is represented by a single difference value.

If the indication of mode 11 encoding error $P_{11}$ is not less than the threshold value T at decision block 208, then control proceeds to block 212. At block 212 the encoder 54 encodes the target cell 72 as a mode 0 inter cell which does not provide subsampling. The encoder 54 generates a mode 0 inter cell for a target cell 72 by determining a matrix of difference values ($t_{1,1}$–$p_{1,1}$) through ($t_{4,4}$–$p_{4,4}$) between the target cell 72 and the predicted cell 84.

FIG. 7 illustrates a method for encoding the target cell 72 as an intra cell at block 112. For one embodiment, the encoder 54 encodes the target cell 72 as an intra cell according to a set of intra cell encoding modes including mode 0, mode 3 and mode 10A. The intra cell encoding mode 0 provides zero subsampling. The intra cell encoding mode 3 provides two to one subsampling, and the intra cell encoding mode 10A provide four to one subsampling.

At block 220, the encoder 54 determines an indication of mode 10A encoding error ($P_{10A}$). For one embodiment, the encoder 54 determines the indication of mode 10A encoding error $P_{10A}$ by blending an indication of the mean absolute difference of interpolation errors for mode 10A ($D_{10A}$) with an indication of the mean squared error of interpolation errors for mode 10A ($M_{10A}$) according to the following equation $$P_{10A} = \beta_{10A} \sqrt{(1 - \alpha_{10A})(D_{10A})^2 + \alpha_{10A} M_{10A}}$$

The term $\beta_{10A}$ is a positive constant, and the term $\alpha_{10A}$ is a constant in a range [0..1] for blending. The encoder 54 determines the indication of the mean absolute difference of interpolation errors $D_{10A}$ and the indication of the mean squared error of interpolation errors $M_{10A}$ according to the following equations The terms r and c represent the number of rows and columns, respectively, in the target cell 72. The term $t_{ij}$ represents the $i^{th}$ row and $j^{th}$ column of the target cell 72 where $t_{1,1}$ is the upper left hand corner.

The weighted blending of $D_{10A}$ and $M_{10A}$ provides a method for adjusting the relative effect of each type of error indication for predicting the quality of the reconstructed image scene. The mean squared error of interpolation errors $M_{10A}$ tends to improve sharp edges and fast transitions while the mean absolute difference of interpolation errors $D_{10A}$ improves the quality of detailed areas of the reconstructed image scene.

Thereafter at decision block 222, the encoder 54 determines whether the indication of mode 10A encoding error $P_{10A}$ is less than a threshold value (T) that corresponds to the current compression level. If the indication of mode 10A encoding error $P_{10A}$ is less than T at decision block 222, then control proceeds to block 224. Otherwise, control proceeds to block 226.

At block 224, the encoder 54 encodes the target cell 72 as a mode 10A intra cell. The encoder 54 generates the mode 10A intra cell by first determining a matrix difference values for the target pixel values t1,1 through t4,4 wherein each line is encoded relative to an immediately preceding line of pixel values of the target cell 72 or a line of gray level values if the preceding line is outside the active video display area of the video frame 70. Thereafter, the encoder 54 performs a four to one subsampling on the difference values such that each 2×2 matrix portion of the target cell 72 is represented by a single replicated difference value.

At block 226, the encoder 54 determines an indication of mode 3 encoding error ($P_3$). The encoder 54 determines the indication of mode 3 encoding error $P_3$ by blending an indication of the mean absolute difference of interpolation errors for mode 3 ($D_3$) with an indication of the mean squared error of interpolation errors for mode 3 ($M_3$) as given by the following equation $$P_3 = \beta_3 \sqrt{(1 - \alpha_3)(D_3)^2 + \alpha_3 M_3}$$

The term $\beta_3$ is a positive constant, and the term $\alpha_3$ is a constant in a range [0..1] for blending. The indication of the mean absolute difference of interpolation errors for mode 3 $D_3$ and the indication of the mean squared error of interpolation errors for mode 3 $M_3$ are given by the following equations $$D_3 = \left( \sum_{i=1}^{r/2} \sum_{j=1}^{c} \left| \frac{t_{2i-1,j} - t_{2i+1,j}}{2} - t_{2i,j} \right| \right) \frac{1}{rc}$$

$$M_3 = \left( \sum_{i=1}^{r/2} \sum_{j=1}^{c} \left( \frac{t_{2i-1,j} - t_{2i+1,j}}{2} - t_{2i,j} \right)^2 \right) \frac{1}{rc}$$

The weighted blending of $D_3$ and $M_3$ provides a method for adjusting the relative effect of each type of error indication for predicting the quality of the reconstructed image scene. The mean squared error of interpolation errors $M_3$ tends to improve sharp edges and fast transitions while the mean absolute difference of interpolation errors $D_3$ improves the quality of detailed areas of the reconstructed image scene.

Thereafter at decision block 228, the encoder 54 determines whether the indication of mode 3 encoding error $P_3$ is less than the threshold value T for the current compression level maintained by the bit rate control function of the encoder 54. If the indication of mode 3 encoding error $P_3$ is less than the threshold value T at decision block 228, then control proceeds to block 230.

At block 230, the encoder 54 encodes the target cell 72 as a mode 3 intra cell which provides two to one subsampling. The encoder 54 generates a mode 3 intra cell for the target cell 72 by determining a matrix difference values for the target pixel values $t_{1,1}$ through $t_{4,4}$ relative to preceding rows as described above, and then by replicating the difference values such that each 1×2 matrix portion of the target cell 72 is represented by a single difference value.

If the indication of mode 3 encoding error $P_3$ is not less than the threshold value T at decision block 228, then control proceeds to block 232. At block 232 the encoder 54 encodes the target cell 72 as a mode 0 intra cell which does not provide subsampling. The encoder 54 generates a mode 3 intra cell for the target cell 72 by determining a matrix difference values for the target pixel values $t_{1,1}$ through $t_{4,4}$ as previously described.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for encoding video data in a video system, comprising the steps of:
   determining an indication of interpolation errors for each of a set of available subsampling modes for encoding a target video frame that contains a set of pixel data values corresponding to an image scene wherein each available subsampling mode performs a differing degree of subsampling on the target video frame, said indication of interpolation errors representing a combined effect of at least two types of errors for each available subsampling mode;
   determining a selected subsampling mode from the available subsampling modes such that the selected subsampling mode provides a highest degree of subsampling of the available subsampling modes that have the indication of interpolation errors below a threshold value; and
   encoding the target video frame according to the selected subsampling mode.

2. The method of claim 1, further comprising the step of encoding the target video frame according to a mode that does not subsample the target video frame if none of the available subsampling modes have the indication of interpolation errors below the threshold value.

3. The method of claim 1, wherein the step of determining an indication of interpolation errors for each of a set of available subsampling modes comprises the step of determining a mean squared error indication of interpolation errors for each available subsampling mode.

4. The method of claim 1, wherein the step of determining an indication of interpolation errors for each of a set of available subsampling modes comprises the step of determining a mean absolute difference error indication of interpolation errors for each available subsampling mode.

5. The method of claim 1, wherein the step of determining an indication of interpolation errors for each of a set of available subsampling modes comprises the steps of:
   determining a mean squared error indication of interpolation errors for each available subsampling mode;
   determining a mean absolute difference error indication of interpolation errors for each available subsampling mode;
   blending the mean squared error indication of interpolation errors and the mean absolute difference error indication of interpolation errors for each available subsampling mode.

6. The method of claim 1, wherein the step of encoding the target video frame according to the selected subsampling mode comprises the step of encoding the target video frame relative to a predicted video frame according to the selected subsampling mode.

7. The method of claim 6, wherein the target video frame and the predicted video frame each contain a matrix of pixel data values comprising a plurality of rows and columns and wherein the step of encoding the target video frame relative to a predicted video frame comprises the step of determining a difference value between each pixel data value in the target video frame and the corresponding pixel data value in the predicted video frame.

8. The method of claim 1, wherein the step of encoding the target video frame according to the selected subsampling mode comprises the step of encoding the target video frame independent of any other video frame according to the selected subsampling mode.

9. The method of claim 1, wherein the step of determining an indication of interpolation errors for each of a set of available subsampling modes for encoding a target video frame comprises the steps of:
   selecting a target cell of the target video frame, the target cell containing the pixel data values corresponding to the image scene;
   determining the indication of interpolation errors for each available subsampling mode for encoding the target cell.

10. The method of claim 9, wherein the step of encoding the target video frame according to the selected subsampling mode comprises the step of encoding the target cell according to the selected subsampling mode.

11. The method of claim 10, wherein the step of encoding the target cell according to the selected subsampling mode comprises the step of encoding the target cell relative to a predicted cell according to the selected subsampling mode.

12. The method of claim 11, wherein the target cell and the predicted cell each contain a matrix of pixel data values comprising a plurality of rows and columns and wherein the step of encoding the target cell relative to a predicted cell comprises the step of determining a difference value between each pixel data value in the target cell and the corresponding pixel data value in the predicted cell.

13. The method of claim 10, wherein the step of encoding the target cell according to the selected subsampling mode comprises the step of encoding the target cell frame independent of any other video frame according to the selected subsampling mode.

14. The method of claim 13, wherein the target cell contains a matrix of target pixel data values comprising a plurality of rows and wherein the step of encoding the target cell independent of any other video frame comprises the step of determining a difference value between each target pixel data value in the target cell and a corresponding set of pixel data values in a preceding row of the target video frame.

15. The method of claim 13, wherein the step of encoding the target cell independent of any other video frame comprises the step of determining a difference value between each target pixel data value in the target cell and a row of gray level pixels if the target cell is located in a top portion of the target video frame.

16. An apparatus for encoding video data, comprising:
  means for determining an indication of interpolation errors for each of a set of available subsampling modes for encoding a target video frame that contains a set of pixel data values corresponding to an image scene wherein each available subsampling mode performs a differing degree of subsampling on the target video frame, said indication of interpolation errors representing a combined effect of at least two types of errors for each available subsampling mode;
  means for determining a selected subsampling mode from the available subsampling modes such that the selected subsampling mode provides a highest degree of subsampling of the available subsampling modes that have the indication of interpolation errors below a threshold value; and
  means for encoding the target video frame according to the selected subsampling mode.

17. The apparatus of claim 16, further comprising means for encoding the target video frame according to a mode that does not subsample the target video frame if none of the available subsampling modes have the indication of interpolation errors below the threshold value.

18. The apparatus of claim 16, wherein the means for determining an indication of interpolation errors for each of a set of available subsampling modes comprises means for determining a mean squared error indication of interpolation errors for each available subsampling mode.

19. The apparatus of claim 16, wherein the means for determining an indication of interpolation errors for each of a set of available subsampling modes comprises means for determining a mean absolute difference error indication of interpolation errors for each available subsampling mode.

20. The apparatus of claim 16, wherein the means for determining an indication of interpolation errors for each of a set of available subsampling modes comprises:
  means for determining a mean squared error indication of interpolation errors for each available subsampling mode;
  means for determining a mean absolute difference error indication of interpolation errors for each available subsampling mode;
  means for blending the mean squared error indication of interpolation errors and the mean absolute difference error indication of interpolation errors for each available subsampling mode.

21. The apparatus of claim 16, wherein the means for encoding the target video frame according to the selected subsampling mode comprises means for encoding the target video frame relative to a predicted video frame according to the selected subsampling mode.

22. The apparatus of claim 21, wherein the target video frame and the predicted video frame each contain a matrix of pixel data values comprising a plurality of rows and columns and wherein the means for encoding the target video frame relative to a predicted video frame comprises means for determining a difference value between each pixel data value in the target video frame and the corresponding pixel data value in the predicted video frame.

23. The apparatus of claim 16, wherein the means for encoding the target video frame according to the selected subsampling mode comprises means for encoding the target video frame independent of any other video frame according to the selected subsampling mode.

24. The apparatus of claim 16, wherein the means for determining an indication of interpolation errors for each of a set of available subsampling modes for encoding a target video frame comprises:
  means for selecting a target cell of the target video frame, the target cell containing the pixel data values corresponding to the image scene;
  means for determining the indication of interpolation errors for each available subsampling mode for encoding the target cell.

25. The apparatus of claim 24, wherein the means for encoding the target video frame according to the selected subsampling mode comprises means for encoding the target cell according to the selected subsampling mode.

26. The apparatus of claim 25, wherein the means for encoding the target cell according to the selected subsampling mode comprises means for encoding the target cell relative to a predicted cell according to the selected subsampling mode.

27. The apparatus of claim 26, wherein the target cell and the predicted cell each contain a matrix of pixel data values comprising a plurality of rows and columns and wherein the means for encoding the target cell relative to a predicted cell comprises means for determining a difference value between each pixel data value in the target cell and the corresponding pixel data value in the predicted cell.

28. The apparatus of claim 25, wherein the means for encoding the target cell according to the selected subsampling mode comprises means for encoding the target cell frame independent of any other video frame according to the selected subsampling mode.

29. The apparatus of claim 28, wherein the target cell contains a matrix of target pixel data values comprising a plurality of rows and wherein the means for encoding the target cell independent of any other video frame comprises means for determining a difference value between each target pixel data value in the target cell and a corresponding set of pixel data values in a preceding row of the target video frame.

30. The apparatus of claim 28, wherein the means for encoding the target cell independent of any other video frame comprises means for determining a difference value between each target pixel data value in the target cell and a row of gray level pixels if the target cell is located in a top portion of the target video frame.

* * * * *